(12) United States Patent
Jändel (10) Patent No.: US 6,763,371 B1
(45) Date of Patent: Jul. 13, 2004

(54) METHOD AND APPARATUS FOR COLLABORATIVE COMMUNICATION IN A COMMUNICATION NETWORK

(75) Inventor: Magnus Jändel, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/307,712

(22) Filed: May 10, 1999

(51) Int. Cl.[7] .................. G06F 15/16; G06F 17/00; H04L 12/16
(52) U.S. Cl. .................. 709/204; 709/203; 370/260; 463/42
(58) Field of Search .................. 709/203, 204, 709/207, 223, 225, 213; 345/717, 733, 736, 748, 753; 370/260, 466; 463/42

(56) References Cited

U.S. PATENT DOCUMENTS

| | | | | |
|---|---|---|---|---|
| 5,506,966 A | * | 4/1996 | Ban | 709/314 |
| 5,630,757 A | * | 5/1997 | Gagin et al. | 463/43 |
| 5,699,521 A | * | 12/1997 | Iizuka et al. | 709/240 |
| 5,838,909 A | * | 11/1998 | Roy et al. | 709/209 |
| 5,864,874 A | * | 1/1999 | Shapiro | 707/201 |
| 5,890,963 A | * | 4/1999 | Yen | 463/42 |
| 5,978,841 A | * | 11/1999 | Berger | 709/217 |
| 5,982,390 A | * | 11/1999 | Stoneking et al. | 345/474 |
| 5,984,786 A | * | 11/1999 | Ehrman | 463/42 |
| 6,015,348 A | * | 1/2000 | Lambright et al. | 463/42 |
| 6,038,599 A | * | 3/2000 | Black et al. | 709/223 |
| 6,061,722 A | * | 5/2000 | Lipa et al. | 709/224 |
| 6,111,582 A | * | 8/2000 | Jenkins | 345/421 |
| 6,128,660 A | * | 10/2000 | Grimm et al. | 709/227 |
| 6,134,590 A | * | 10/2000 | Perlman | 709/228 |
| 6,166,732 A | * | 12/2000 | Mitchell et al. | 345/733 |
| 6,179,713 B1 | * | 1/2001 | James et al. | 463/42 |
| 6,226,669 B1 | * | 5/2001 | Huang et al. | 709/204 |
| 6,247,068 B1 | * | 6/2001 | Kyle | 709/328 |
| 6,256,661 B1 | * | 7/2001 | Terahama et al. | 709/201 |
| 6,301,609 B1 | * | 10/2001 | Aravamudan et al. | 709/207 |
| 6,317,794 B1 | * | 11/2001 | Papierniak et al. | 709/229 |
| 6,338,086 B1 | * | 1/2002 | Curtis et al. | 709/218 |
| 6,390,922 B1 | * | 5/2002 | Vange et al. | 413/40 |
| 6,393,461 B1 | * | 5/2002 | Okada et al. | 709/204 |
| 6,397,282 B1 | * | 5/2002 | Hashimoto et al. | 710/260 |
| 6,463,078 B1 | * | 10/2002 | Engstrom et al. | 370/466 |
| 6,574,674 B1 | * | 6/2003 | May et al. | 709/313 |
| 2003/0204566 A1 | * | 10/2003 | Dhupelia et al. | 709/205 |
| 2004/0030787 A1 | * | 2/2004 | Jandel et al. | 709/229 |

OTHER PUBLICATIONS

Chiueh, Tzi–Cker, "Distributed systems support for networked games", IEEE Sisth Workshop on Hot Topics in Operating Systems, pp. 99–104, May 1997.*

Boulic, Ronan et al., "Integration of motion control techniques for virtual human and avatar real–time animation", ACM VRST '97, pp. 111–118, Sep. 1997.*

Singhal, Sandeep K. et al., "Registration rooms, lobbies, and portals: interconnecting large–scale networked virtal environments and collaborations", IEEE Virtual Reality Annual International Symposium, pp. 213, Mar. 1998.*

* cited by examiner

Primary Examiner—Jason D. Cardone (57) ABSTRACT

The real-time performance in communications networks is improved, especially between a large number of participants, by a server unit having a device for receiving information from at least a client unit, the information including at least part of the state information about a distributed interactive application. The server unit includes a device for storing application state information received from at least one client unit, and a device for forwarding the state information received from the client to at least one other node in the network and for transmitting at least part of the information stored in the state information storing device to the at least one client. In this way, the whole state of the application can be kept in one or more units in the network, which removes the need for each client to store the entire state, thereby reducing memory and bandwidth requirements for each client.

17 Claims, 3 Drawing Sheets

METHOD AND APPARATUS FOR COLLABORATIVE COMMUNICATION IN A COMMUNICATION NETWORK

BACKGROUND

The present invention relates to communications networks and in particular to the real-time communication between several users in such networks.

Communication units enabling simultaneous communication between several users are known in the art. For multi-part telephone or video communication a Multi-part Communications Unit (MCU) may be used. Such a unit receives data, for example, voice data, from a number of participants, for example, via their telephones, and forwards to each user the data received from all other users. In this way, all users can hear what everybody else is saying.

With an MCU, therefore, the number of participants is restricted, typically to 6–12 participants for two reasons: A larger number of participants would require a too high bandwidth, since the amount of information to be transmitted would become very large. Also, even if the bandwidth limitations were overcome, the information received by each user would consist of contributions from a large number of other people and would be difficult to interpret.

Multi-user communications applications are currently being developed, for example for multi-user games. For such applications, three main synchronization models are used: client-server synchronization, peer-to-peer synchronization or broadcast synchronization. Some multi-user games on the Internet today involve up to 100 000 players, of which several thousand may be playing at the same time. All synchronization methods used today cause rather long delays. Therefore, the multi-user games played over the Internet today are games in which the speed is not critical. For example, fast action games, such as car racing games or battle games, in which the user must react to what is happening within fractions of a second cannot be played with acceptable quality using this method.

Dial-in networks typically use client-server synchronization. In this case, the central server is an obvious bottleneck in the system. Central client-server games can support 2–250 players. The higher number refers to servers where the update rate is as low as 2 Hz. The server receives data from all players. It has to find out what information each player needs and send it. The central server adds latency both because of the increased transport distance and the processing and scheduling delay in the server. Consider e.g. a situation where the clients are on the U.S. West coast while the server is on the U.S. East coast. About 80 ms of transport latency and at least several 10 ms of processing latency are caused by the client-server mode of operation.

Therefore, client-server synchronization is not feasible for real-time applications with large numbers of players in which the delay is critical.

Peer-to-peer synchronization means that all clients send application data directly to all other clients. This model is frequently used for games that are played over the public Internet. Game developers provide a free application lobby server where player meet for setting up games and for joining ongoing games. Once a game has started it is played in the peer-to-peer mode without drawing any resources from the game developer's site.

Peer-to-peer synchronization has obvious scaleability problems since the network load is proportional to the square of the number of players; the client access bandwidth and CPU power requirement are proportional to the number of players. The payload in each packet is 10–40 bytes, which means that the protocol overhead usually is more than 50%. Small game packets give a large protocol overhead. With header compression methods, however, this overhead can be reduced significantly.

Peer-to-peer games over the Internet suffer from unpredictable delays and frequently collapse because of loss of synchronization.

It follows that peer-to-peer synchronization is best adapted to small networks, with communication over relatively short distances and between a limited number of users.

Because of the restrictions posed by among other thing the synchronization methods, multi-participant communications with good real-time characteristics is not possible with current technology.

It is an object of the present invention to improve the real-time performance in communications networks, especially for collaborative communication between a large number of participants.

SUMMARY

This object is achieved according to the invention by a server unit for use in a communications network, the server unit comprising a device for receiving information from at least a first client unit, the information comprising at least part of the state information about a distributed interactive application, the server unit comprising a device
- for storing application state information comprised in the information received through the receiving means from at least one of the first and second client units.
- a first device for forwarding the state information received from the at least first client unit to at least one other node in the network and
- a second device for transmitting at least part of the information stored in the state information storing means to the at least one client unit.

This enables keeping the whole state of the application in one or more units in the network, which removes the need for each client to store the entire state, thereby reducing the need for memory capacity in each client and also the bandwidth needed for communication with each client. If each part of the state of the application is stored in more than one network node or client, a back-up facility is achieved.

The object is also achieved according to the invention by a client unit for use in a terminal in a communications network, comprising an application software for a distributed interactive application client unit having
- at least one input device for reading an input from the terminal, the input constituting at least application state information for the distributed interactive application
- a device for transmitting application state information to an application access server
- a device for receiving at least application state information for the distributed interactive application from the application access servers and a display for the state information.

The method and apparatus according to the invention are particularly useful for distributed interactive applications, especially involving real-time communication.

Preferably, the receiving devise of the server unit adapted to receive priority information from at least the first client, the priority information identifying objects of the distributed interactive application about which the first client wishes receive information, transmit information to the at least one client unit in dependence of the priority information received from that client unit.

the server unit further comprising at least one client priority list for storing the priority information.

Accordingly, the client unit further comprises a device for setting priority information for specifying at least one object of the distributed interactive application from which available information should be received as soon as possible and a device for transmitting the priority information to the application access server.

This reduces the amount of information to be transmitted to each user, thereby reducing the transmission delay and also helping each user analyze the information, since only the most important information for a particular user is shown to that user. Each client is able to decide for itself what is important.

In a preferred embodiment, the receiving device is adapted to receive urgency information relating to the first client from at least a second client. The urgency information may be transmitted to the first client, or application state information regarding the second client may be forwarded to at least the first client in dependence of the urgency information. The urgency information may also be used to indicate that certain application state information should not be forwarded to the first client. The urgency information may be used to change a client priority list.

In a preferred embodiment the client unit further comprises a device for setting urgency data for specifying at least one other client that should receive state information from the client as soon as possible.

Advantageously, the transmission device of the client unit for transmitting application state information is adapted to arrange information in object information packets, each packet relating to one object constituting part of the application, before transmitting the packets to the server unit and the receiving device is adapted to extract information from packets received from the server unit.

The application access server system is independent of the application and can therefore support a wide range of different applications.

Application access server units working together could communicate over a reserved (virtual) network. The aggregated bandwidth requirement of an application can be estimated by the network management system and sufficient network resources can be allocated to the reserved network that is connecting the application access server units. New applications are allowed only if resources are available. The network management also controls the resending and duplication policy of the application access server units. Multicasting and resource reservation protocols can be used on the aggregated streams between the application access server units. The advantage of this system is that resource reservation on the player level is not necessary. Application clients can usually handle occasional lost packets if the overall statistical performance is good. Using the application access server according to the invention means that a game client never will lose synchronization permanently since the application access server units always maintain the game state.

BRIEF DESCRIPTION OF THE DRAWINGS

The apparatus and method according to the invention will be described in more detail in the following, with reference to the appended drawings, in which.

DETAILED DESCRIPTION

Figure 1:
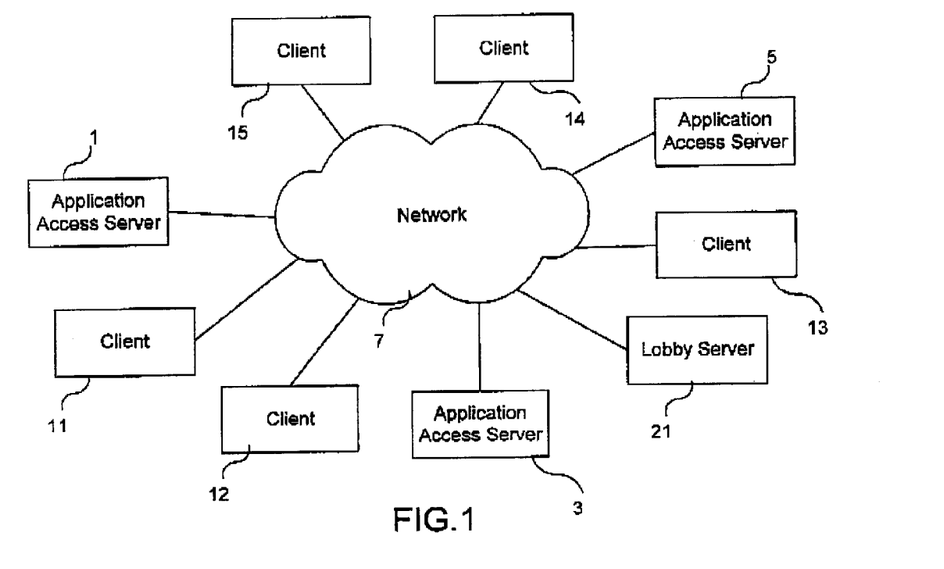
FIG. 1 illustrates an embodiment of a network according to the invention.

FIG. 1 shows an embodiment of a communications network according to the invention. According to the invention, the network comprises at least on application access server. In FIG. 1, a first 1, a second 3 and a third 5 application access server are shown, connected to each other through a network 7, for example a reserved telecommunications network. It may also be any other type of network, however, networks in which it is not possible to reserve network resources, such as the Internet, are less feasible. A number of clients 11, 12, 13, 14, 15 are also connected to the network 7. A client can connect to the appropriate application access server 1, 3 or 5 in any way known in the art, as will be discussed in more detail below.

Clients communicate with each other through the application access servers for the purpose of running a distributed interactive application, in which a large member of participants simultaneously affect and contribute to the state of the application, for example a real-time multi-user game. Between each client and the application access server to which it is connected there will usually be a low capacity connection such as a modem connection. Between two application access servers, on the other hands high and variable network capacities will be available. The application access servers according to the invention are therefore adapted to handle the information about the state of the application in such a way as to reduce the amount of information transmitted to each client, by transmitting to each client only the information that is most relevant to this client. Between the application access servers, the transmission capacity will normally not be a problem and therefore more information can be transmitted between application access servers.

One or more application lobby servers 21, of a kind known per se, may also be present in the network. These servers typically comprise functions that allow the clients to register for a particular type of service, handle billing functions, etc.

According to the invention, the software required for the application is found in the client 11, 12, 13, 14, 15. To use the communication functions according to the invention, therefore, the user must make sure he has the application software needed. The application software may be retrieved in any way known in the art, for example, downloaded from the Internet or installed from CD-ROM. If required for the application he must also register with the application lobby server. Typically, the application lobby server 21 will provide an address, usually an IP address of one or more application access servers 1, 3, 5, but this address may also be obtained in any other way.

The user connects to an application access server in the way common in the art, normally by entering die IF address of the application access server or a pool of application access servers. Several algorithms exist for selecting the appropriate one of a number of nodes in the network identified by the same address. The application access server receives information from the user and starts transmitting information to the user, as will be described in more detail in the following. Instead of the client logging in to the application access server, the application lobby server can also transmit client network addresses to the application access servers.

The application is assumed to consist of a set of objects, which are controlled by the participants. An object is an entity in the application that is controlled by a human participant or that otherwise cannot be regenerated locally in each application client Application objects can be things that the participants will intuitively recognize as objects or game figures but they can also be background data structures such as environment variables that are controlled by players. An application object is controlled by one or several players. Each object typically has a set of properties and attributes that may be changed while the application is running. In a game these properties may be a character's strength and other capabilities, or the maximum speed of a car, and the attributes may be for example, items collected by the character.

The information received from the user will normally comprise three different types of information, in addition to the signalling overhead: state information, priority information and urgency information. The state information is information about the object or objects that are controlled by the user and that should be distributed to other users of the application. The priority information lists the client's priorities regarding different application objects provided by the application access servers. For example, information from a certain group of other users should be received at once, or as often as possible, whereas information from another group of users should is not that urgent. Several priority levels may be set, for example, in the form of acceptable delays. The urgency information generated by a client may be used to override or change the priority list of another client so that the other client will receive information about objects that are not on its priority list, or to make sure that the client does not receive certain information. All three types of information will be discussed in more detail below.

As an example, the application of a real-time game being played by a large number of users, will be described. Such games are played today with a limited number of players, located fairly near each other, for example in a local area network (LAN). Played over a wide area network, such a game may in the future involve several thousands of players, typically distributed over a large game field, or virtual geographical area. With prior art technology this is not possible with an acceptable quality, as discussed above.

Each player is immediately affected only by the things that happen near him. The farther away another player is the less important changes to this player will be. For example, a player may be involved in a fight with a first hostile player, a friendly player may be coming to rescue and a second hostile player may be trying to stop the friendly player. At the same time, other players will be doing things that may become interesting at a later time but for the time being, the players main concern is to survive the fight. Therefore the movements of the first hostile player must be displayed immediately. The movements of the friendly player and the second hostile player should also be given a high priority, while the things happening farther away should be given a low priority.

In the example discussed above, obviously, the configuration of the players will change so that at another time information from other players will have the highest priority, usually, the players who are located near the user at any given time.

The application access server also keeps a client authority list. Each client has the right to change the state of a set of game objects. The client authority list has one entry for each client where the numbers of the objects that are controlled by the clients are stored. The application access server checks the authority each time that it receives object state information from a client. The game state will be updated only if an identifier found in the information packet matches one of the numbers in the entry for the client in the authority list, otherwise the information is ignored. Object state information arriving from other application access server units is not verified since the sending application access server already has checked for authority.

The application access server handles communication with application clients. It receives information about the actions of the client that affect the application state and other information. It also transmits application state information from other participants to the participants according to their priorities. Each application client sets priorities on what application information to receive and transmits information about these priorities to the application access server. The application access server stores and updates a record of the priorities of the clients that are served by the application access server. The priorities of each client are used to determine which data is to be sent to this client.

Each application access server also communicates with other application access server units, sending application state information and aggregated priorities to them and receiving the same type of information from them. Aggregated priorities are the sum of all application object requests from clients belonging to a given application access server. For example, the application access server may use multicasting to other application access server units. This ensures that each application access server unit receives all needed updates and that the game state is distributed efficiently over the application access server units.

Usually, the information to be transmitted to the other application access servers is packaged according to an appropriate protocol and transmitted without being prioritized or sorted in any way. It would of course be possible to select the information to be transmitted to each application access server in dependence of the users' priorities.

The application access server also stores and updates a complete or partial copy of the application state. The application access server units that are allocated to an application must collectively store the complete application state. In the simplest case, every application access server stores the complete application state, but it is also possible to split the information between the application access servers, with or without overlapping information. Such solutions require special software to handle the distribution of the appropriate software to each application access server.

The application access server communicates with the Application Lobby Server for setting up the application, adding and removing participants while the application is running and handling errors and network failures.

The application access server also handles communication protocols, for example, the Internet Protocol (IP), and exchanges application state updates with other application access server units.

Figure 2:
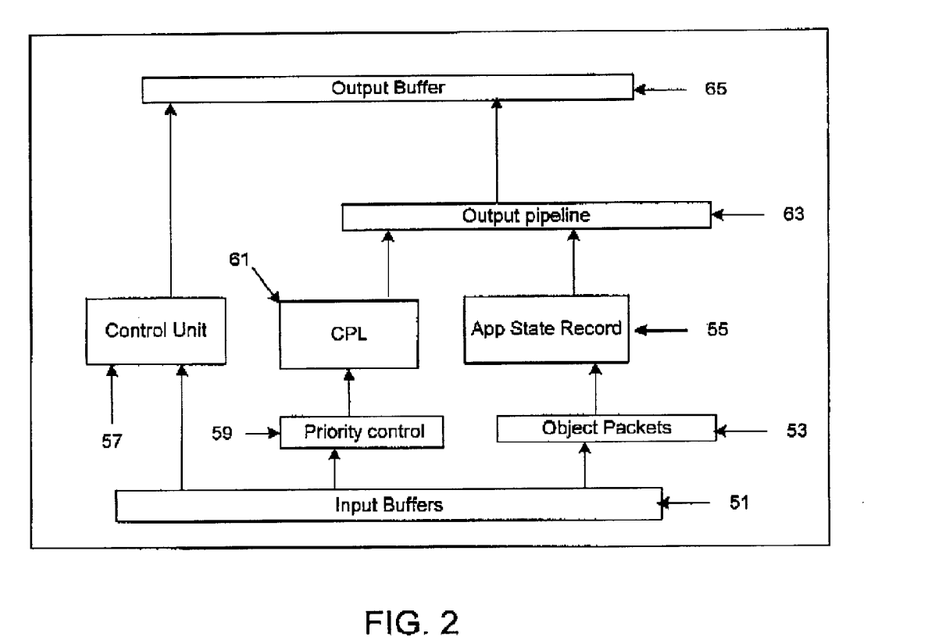
FIG. 2 illustrates an application access server according to an embodiment of the invention.

FIG. 2 shows an application access server according to an embodiment of the invention, with its functional entities. This application access server could be implemented in hardware or in software. In connection with FIG. 2, only a general description is given. Appropriate formats and protocols will be discussed later.

The application access server receives data from each client in the network, and from other units, such as other application access servers, through input buffers 51. There is one input buffer for each client, remote application access server and application lobby server, although in FIG. 2, for clarity, only one input buffer is shown.

The data received from the clients may comprise three types of data state: data about the state of the application, data about the priorities of the client and other control information. The state data is passed through an application object packet pipeline 53, to an application state record 55. The application state record 55 keeps all the state data for all the relevant objects, as will be described in more detail in the following. The application state record also keeps the information about the urgency of application data for each client. Urgency data is set by a client if the data is important to another client but this other client is not aware of this and therefore cannot set his own priority data. The urgency is therefore defined by the sending client and may be different for different receiving clients. The application access server alerts the receiving client if urgent data is waiting. The urgency information may also be used to prohibit the forwarding of certain information to one or more clients.

Groups of clients may be defined, said group for example comprising the participants in a working group or, in the case of a game, in the same team. In this case, priority data and/or urgency data may also be specified for groups of users, not only for individual users.

Control data, especially data that does not have to be handled in real time, such as information on added or removed application objects, is passed from the input buffer 51 to the application access server control unit 57. In a hardware implementation the control unit 57 may be a microprocessor. Control data handled by the control unit could be related, for example, to the creation and destruction of players and objects, and to groups of players and objects.

Priority data is passed through an application priority control protocol message pipeline 59 to a Client Priority List (CPL) 61 containing the priorities of each client that is supported by the application access server. The priority list is kept in the CPL 61 and it can be updated by the clients and by the application access server control unit. The control unit could decide, for example, to update the priority list of a client in response to an urgency message received from another client.

Each client controls what application information to receive by sending priority request to the application access server. Several different prioritization strategies can be employed by the application clients using the application access server system. A simple method is that application clients send an enumerated list of objects to the CPL 61. If all objects in the list have been updated the remaining objects could be updated for example in a round robin mode. The priority list of a particular client comprises a list of all objects for which a priority has been set by this client. In addition the list stored in the application access server preferably comprises a flag for each object indicating if new information for the object has been received. The flag is used to determine whether or not information about a certain object needs to be sent to the client. When the information has been sent to the client, the flag is reset. When a new update for an object is received by the application access server, the flag is set again.

The client priorities could also be defined with a time interval associated to each object. The client would then send a series of requests, for example of the format: <object number>, <object priority>, <object update time interval>. <flags>. A simple list could simply have the format <object number>, <object priority>. The application access server will try to send updates to the client so that each object is updated at least once during each time interval with the priority given according to the <object priority> field in the request. An infinity symbol could be used so that some objects are not updated at all. A special "send only new complete object state" flag can be set. This option is used when the client wants to receive updates for the object with long (several seconds) intervals. It would be wasteful to send incremental updates if the wanted time resolution is longer than the state refresh interval.

An output pipeline 63 receives priority information from the client priority list 61 and uses this information to search the application state record 55 for information to be transmitted to the client in question, using an appropriate algorithm as discussed above. The selected state information passes from the application state record 55 through the output pipeline 63 to an output buffer 65 and from the output buffer to the client, the control unit 57 sends control messages to clients and remote servers, for example, for the purpose of synchronizing clocks or providing latency estimates to clients.

Although the application access server shown in FIG. 2 is shown to have only one of each type of unit, preferably the application access server comprises one input buffer 51, one application object packet input pipeline 53, one priority message pipeline 55, and one output processing pipeline 63 and one output buffer 65 for each client, and for each other server, etc. in the network with which the application access server exchanges information, or a group of clients or servers, could share one input buffer 51, one application object packet input pipeline 53, one priority message pipeline 55, and one output processing pipeline 63 and one output buffer 65. The application access server also comprises one client priority list 61 for each client, server, etc.

The data received from other application access servers comprises object state data from other clients. It may also comprise priority information from these clients, which is preferably aggregated in such a way that each object appears on the priority list only once. In this case, the information will be packaged so that each application access server has one priority list, that is, each application access server is treated like a client. The information received from another application access server is treated in the same way as the information received from a client, except that the input and output buffers 51, 65, also have to perform certain protocol handling, as will be discussed below. Alternatively, no aggregated priority information will be received from other application access servers, in which case all state information will be transmitted to these application access servers.

The actions of each local participant are sent as payload in application object packets that arrive in the input buffer of the application access server associated with this client. These application object packets update application objects that are controlled by the participant. The application object packets are written into the application state record using a set of insertion rules.

The application access server handles optional fair play modes where all players are updated simultaneously (see below).

As mentioned above, one or more application lobby servers, of a kind known per se, may be present in the network. Application lobby servers are responsible for updating the configuration data dune the game providing the application access server with data such as:

IP addresses or other network addresses of new application access server units that enters the game Updated lists of network addresses that identify the participants that are served by the application access server. This enables new participants to join an ongoing application.

Updated lists of enumerated game objects. For each object it is specified which application access server that is responsible for storing the state. It might also be specified who is authorized to update the state. This enables creation, destruction and change of control of game objects. Clients can also create and destroy game objects.

A new complete or partial game state. This enables recovery after a pause or failure in the game when the application access server system has discarded the game state.

Figure 3:
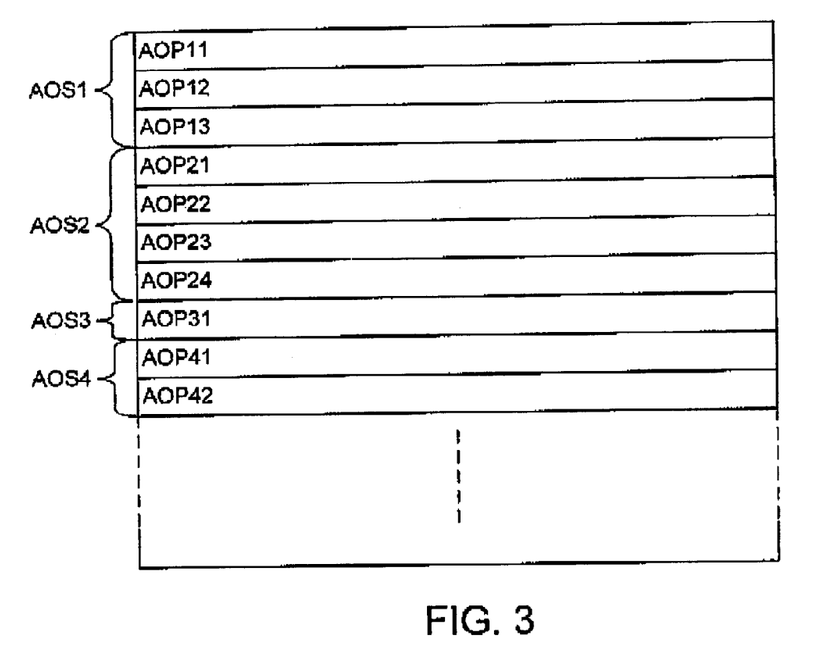
FIG. 3 shows an embodiment of an application state record according to the invention.

FIG. 3 shows an example of an application state record used in the application access server according to the invention:

The state of each application object is stored in the application state record as a set of enumerated application object states AOS1–AOS4. An application object state consists of a series of application object packets AOP11–AOP42. An object packet is a container for object data. All data that is sent from an application to a remote application client or server is wrapped in an application object package so that it can be handled by the application access server system.

The information received by an application access server from all other application access servers to which it is connected is used to update the application object information in the application state record. Preferably, an application object packet may be of two different types: a basic application object packet comprising all current data about an object, and an incremental packet comprising only information about what has changed since a time that is given by the time stamp of the APO to which the incremental packet refers.

The application state record also keeps a record of the application object packets that need to be delivered to other application access server units. This may be done using a data structure new_client_data that can be implemented as a matrix new_client_data(i, k) where each element is a flag. The parameter i is a client number and the parameter k is an application access server number. The flag is set if the application object packet should be delivered to the external application access server.

As an example of how application object states can be used to describe application objects, FIG. 3 shows an application object state AOS1. This object might describe the position of a vehicle in a racing game. The position of vehicle (x1, y1) is first sent as game payload in a basic application object packet AOP11 at game time t1. To save bandwidth, the relative change in the position ($\Delta x2$, $\Delta y2$) at game time t2 is transmitted as an incremental application object packet AOP12. The incremental application object packet AOP12 points to the basic application object packet AOP11 as reference. At game time t3 a new incremental position ($\Delta x3$, $\Delta y3$) is sent in a third application object packet AOP13. The third application object packet AOP13 has the second application object packet AOP12 as reference. After having received all three application object packets AOP11, AOP12, AOP13, the client can calculate the position of the vehicle at time t3 according to (x1+$\Delta x2$+$\Delta x3$, y1+$\Delta y2$+$\Delta y3$).

When a new basic application object packet is received for a particular object, the application state record can delete all previous packets belonging to the object and just store the new basic packet. Note that the syntax and semantics of the game payload can only be understood by the game application running on the client terminal. Applications should send basic packets frequently in order to avoid long interrupts caused by lost data.

An alternative way of coding the application would be to let the third application object packet AOP13 at time t3 use die basic application object packet AOP11 as reference and state only the change of position, $\delta x$, $\delta y$. This would save application access server memory since the second application object packet AOP12 at time t2 could be deleted as soon as the third application object packet AOP13 arrives. The client would now calculate the position of the vehicle at time t3 according to (x1+δx3, y1+δy3) The client is responsible for coding the came efficiently. The application access server uses information in the application object packet header for determining if a application object packet is expired and can be deleted. FIG. 3 shows how AOS 2 consists of four application object packets AOP21, AOP22, AOP23 and AOP24, where the first one AOP21 is a basic packet and the three following application object packets AOP22, AOP23, AOP23 are incremental. The last increment has time stamp t8. AOS 2 thus describes the state of object 2 up to game time t8. The AOS 3 in FIG. 3 consists only of one basic application object packet AOP31, which is sufficient for describing the object.

Before allowing a new client to sign on to the application, the application access server may, according to a preferred embodiment, estimate the increased bandwidth needed and ensure that this bandwidth is available in the network. Methods for doing this are well known in the art If no capacity problems are foreseen, this step will not be needed.

Figure 4:
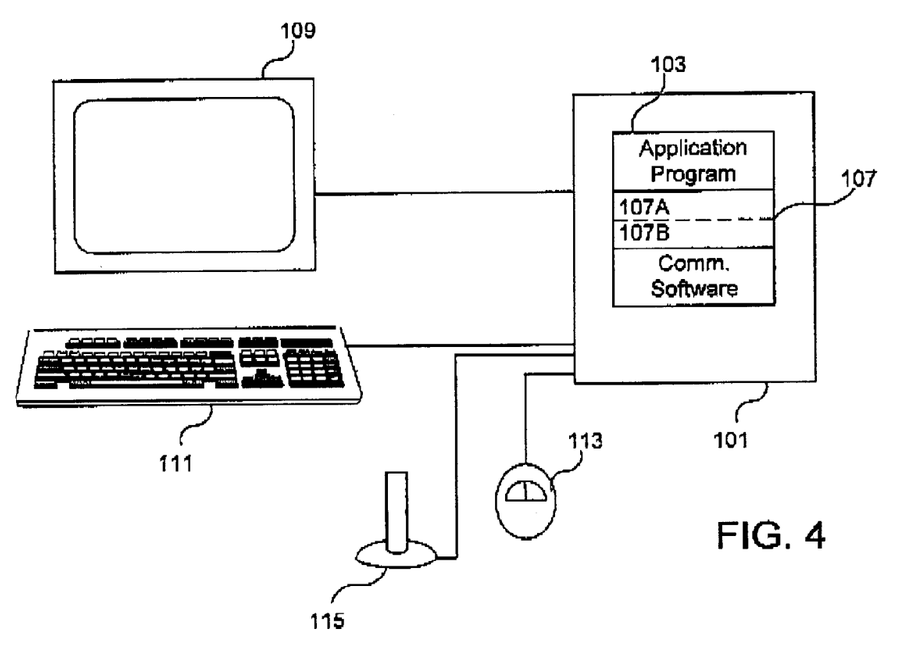
FIG. 4 shows an application client according to an embodiment of the invention.

FIG. 4 shows an embodiment of a computer on which a client according to the invention is running. The computer comprises a processing unit 101 in which programs are run, for example an application program 103 according to the invention. The processing unit also communicates with an application access server (not shown) and possibly other units in the network, by means of communications software 105. The application program 103 communicates with communication software 105 through a network application programming interface (API) 107. The API has functions for sending and receiving application data from the application program.

The computer also comprises a screen 109 for displaying data about the application, for example an overview of the part of the game that is of immediate interest to the participant. For inputting data to the application for example, the computer may have a keyboard 111, a mouse 113 and/or a joystick 115 connected to it, by means of which an object in the game may be moved, or other types of changes may be entered.

The client application 103 receives said input processes it and displays the result of it on the screen 109, and/or by means of for example loudspeakers and/or haptic display means. It also forwards application state data based on said input to the application programming interface 107, from which it is forwarded to the application access server.

Through the communications software 105 and the application programming interface 107 the application 103 also receives application state information concerning other objects from the game access server, processes it and displays the result on the screen 105.

In this embodiment the application programing interface comprises two parts: a network API 107A and an application access interface (AAI) 107B. This solution was chosen to enable the use of a standard program module, such as Microsoft DirectPlay, for implementing the network API 107A, as discussed below.

The application access interlace (AAI) 107B is a software module in the client terminal. It is an intermediate module between the network interface and the network API 107A. The application access interface 107B receives and terminates application object packets and control messages, and removes application object packet headers before the application object packet payload is passed to the network API 107A. It also translates control messages and passes them to the network API 107A or handles them directly. The AAI 107B handles functions that are required for the communication with the application access server to function but that are not implemented in the client application program. Therefore, it may not be necessary for clients that have been developed for use with an application access server according to the invention. For example, the AAI can handle the clock that places time stamps on the application object packages, if the client does not have functions for this.

In the upstream direction, AAI 107B receives messages from the network API 107B. Application messages are wrapped as application object packet blocks. Message addresses from the network API are transformed into the application object packet format. The urgency of the message can be indicated using the urgency field in the application object packet. Application object packets are transmitted over the communication link to the application access server.

The application access interface 107B also generates upstream application control protocol messages, in particular, application control protocol priority messages. The information that is needed for setting up priority lists and other application control protocol messages must be extracted from the network API and from urgency list messages from the application access server.

A physical client e.g. a game console could be engaged in several games or host several human players in the same game. Each physical application client can run several logical application clients where a logical application client corresponds to one instance of an application connected to one instance of the Application Access Interface. Application clients in this document correspond to a logical application client. A network address pointing to a logical application client could consist of the IP address of the physical client combined with the port number of the application access interface.

The client application also sets priorities for which information to receive and urgency information, as discussed above. An essential problem is how priority lists can be generated by the application access interface only by using the network API. The application and the API might be more or less suitable for this. Applications written for the client-server mode would work well with the application access server system.

The best performance is achieved if the application access server system is considered when the application program is developed. Functions for determining priority lists indicating the preferred order of receiving messages can then be included in the application program. Messages could be directly directed to a co-player with high urgency if it is apparent from the situation in the game that the receiving player cannot predict the high priority of the message. Consider e.g. a situation in a game where player 1 is stalking player 2. Player 2 is suddenly attacked by player 1 without having any warning. Player 2 is unable to set the correct priority for messages from player 1 but player 1 can send a high urgency message to player 2.

For developing the network API, for example, the Microsoft DirectPlay API may be used. The AAI is then needed to format the output such as ACP and AOP, and may be written as a DirectPlay service provider.

Using the Microsoft DirectPlay API there are at least two different ways of extracting priority lists. Note that the priority list should show the order of priority of the local participant for receiving updates about enumerated application objects. Application objects in this document are the same as "players" in the DirectPlay notation since Direct-Play "players" are application entities that can send and receive messages. A DirectPlay "player" can be controlled by a human player or it could be an autonomous game object.

The first method is using information gained from DirectPlay's receive method. By setting the DPRECEIVE_FROMPLAYER flag and specifying IpidFrom parameter appropriately, the method can retrieve the first message from the "player" that is identified by the IpidFrom parameter. This information can be used by the application access interface for making the priority list. If no message from the identified "player" were available in the DirectPlay message queue, it would be reasonable to put the identified application object at the top of the priority list.

The second method is using the DirectPlay Send method where the idTo parameter identifies the "player" or player group that should receive the messages It is reasonable to assume that "players" that are receiving frequent messages are associated to application objects that the local player presently is interacting with. The AM could hence put "players" identified by the idTo parameter high in the priority list.

Figure 5:
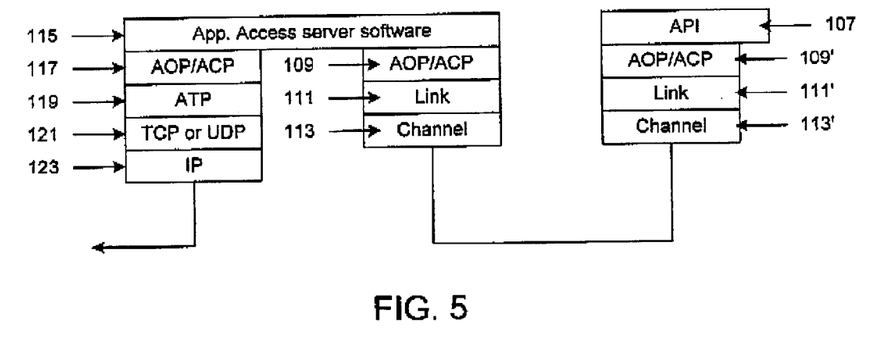
FIG. 5 illustrates the communication stacks used according to an embodiment the invention.

FIG. 5 shows an example of the communication stacks that may be used according to the invention. One communication stack is used for the communication between a client such as the one shown in FIG. 4 and an application access server. The client and the application access server comprise essentially the same type of stack. In the client the uppermost layer of the stack communicates with the application access interface layer 107 of FIG. 4, and in the application access server the stack communicates with an application access server software is also shown. FIG. 5 also shows a communication stack for use between an application access server and another unit in the network. This other unit may be, for example, another application access server, or an application lobby server. The communication stacks used conform to the OSI model.

The client communication stack communicates with the application programming interface 107 in the client. The uppermost level of the stack, is the ACP/AOP layer 109. This level is handled by the application access interface 107 in FIG. 4.

From the ACP/AOP layer 109 ACP/AOP packets containing information such as application state data or priority data are delivered to a link layer 111. The link protocol may be for example PPP. In the opposite direction, the ACP/AOP layer 109 removes header information from information packets received from the application access server and forwards the application state information to the client application. The ACP packets may be terminated in AAI. The priority information itself can be handled by the client itself, if it comprises functions for handling the priority information.

The lowest layer is a channel layer 113, comprising channel coding and the actual physical connection.

The application access server comprises essentially the same type of stack for communication with the client: a channel layer 113' corresponds to the channel layer of the client. The channel layer 113' is connected to an AOP/ACP layer 109' through a link layer 111'.

An AOP/ACO layer 109' in the application access server communicates directly with an application access server software 115 which is arranged to handle the AOP and ACP information.

The application access server can be built with interfaces to many different client link protocols. Ideally, an application access server should be able to handle any link protocol including UDP, TCP and RTP, RTP is a protocol developed specifically for the transmission of voice and video data.

The link protocol should be designed so that the protocol overhead on the link from the application access server to the client is kept low. This can be done using an appropriate link protocol where IP/UDP/RTP is not used or by efficient IP/UDP/RTP header compression. The link layer should further minimize latency and provide information to the application access server on the properties of the link. Such information could include expected bandwidth, bit error rate and link latency.

An appropriate transport protocol, here called the application transport protocol. ATP should be used on the link but application object packets and application control packet messages could also be sent directly via the link protocol.

For communication between two or more application access servers, a stream of IP packets are sent from the output buffer 65 of the local application access server (see FIG. 2) to one or more remote application access server units participating in the ongoing application. Each IP packet contains a TCP or UDP packet and the TCP or UDP payload is an Application Transport Protocol (ATP) packet.

The uppermost protocol layer of the communication stack for communication between two application access servers is an AOP/ACP layer 117 similar to the one used in the client communication stack. An application object packet might be quite small, that is, ~40 bytes or less. To make the communication between two application access servers more efficient, several application object packets are therefore aggregated in an application transport protocol (ATP) layer 119. The next layer is a TCP or UDP layer 121 and the lowermost layer is an IP layer 123, both of which are well known in the art. From the IP layer 123 information packets are transmitted to remote application access server units. The output buffer unit (65 in FIG. 2) keeps a set of sorting buffers for collecting application object packets that will be the ATP payload. The structure of these buffers depends on the distribution strategy. There might be one sorting buffer for each remote application access server.

All new_client_data flags that correspond to the new application object packet are set. Each application object packet includes a field describing what clients that should get the update. This field is translated to a list of application access server units that should receive the application object packet. The application access server keeps a table that matches client numbers to application access server numbers, new_client_data flags that marks such application access server units are set. This means that all relevant application access server units eventually will get the update.

The local application access server identifies application object packet packets that need to be sent to remote clients via remote application access server units. The ASR of the local application access server is therefore scanned and application object packets with the new_client_data flag set are found. The recipient group field in the header of any such application object packet is examined. Client addresses are translated to remote application access server addresses and copies of the application object packet are put into the sorting buffers that correspond to the recipient application access server units. The recipient group field is modified for each application object packet copy so that only recipient clients that belong to the receiving application access server or group of application access servers remain. The new_client_data flag is reset.

ACP messages from the application access server to a remote application access server units are collected in the sorting buffers of the IP processing units. They will be sent as payload in ATP packets. As an example of ACP messages to remote application access server units, consider e.g. resend messages. The local application access server scans the time stamps of the object states in the ASR. If a state is too old this might be due to a lost ATP packet. An ACP message containing a resend request to the application access server that is responsible for updating the object is then sent.

In the embodiment discussed here, three non-standard protocols are used in addition to standard Internet protocols such as IP, TCP, UDP and RTP:

Application Object Packet (AOP) is a container for game data. All data that is sent from a game application to a remote game client or server is wrapped in an AOP so that it can be handled by the application access server system.

Application Control Protocol (ACP) is used for sending control messages. Control messages are sent between application access server units, clients and application lobby servers.

Application Transport Protocol (ATP) is used for sending aggregated game data between application access server units and optionally also between application access servers and clients.

Application Object Packets contains messages from the game application. The application access server system can not read the internal message format of the games. Such messages are therefore wrapped in an application object packet (AOP). The header of an AOP can be read by the application access server system. It is used for appending information that is needed for the timely delivery of the game pay-load.

Application messages can completely define the state of an application object or they can alternatively describe the application object relative to a reference state. AOPs are therefore of two types: Basic Packet (BP) and Incremental Packet (IP). The first AOP in an AOS must be a Basic Packet, which may be followed by a set of Incremental Packets, or by a basic packet Some games will only generate basic packets.

An application object packet consists of a header followed by game specific pay-load: Header fields preferably used in the AOP are:

1) Application object number
2) Time stamp showing the time in the game when the AOP was generated
3) Optional packet number. Combined with the object number and the time stamp it creates a unique identifier of the packet. Packet numbers are only used if several AOPs, belonging to the same game object, have the same time stamp.
4) if, for example, voice and/or video information may be transmitted, a flag showing if the packet contains this type of information may be included.
5) A flag showing if the AOP is a basic packet or an incremental packet
6) If the AOP is incremental, a pointer to the reference AOP. This pointer could consist of the time stamp and the packet number of the reference AOP. The reference AOP could be either a basic AOP or an incremental AOP.
7) A record describing the clients that should receive the message. This can be done by listing the clients or use a predefined client group. The default is that all clients receive the data. An urgency field is associated with each receiving client or client group. This field is used for alerting the receiver if the message is urgent. Three urgency bits would be sufficient. Flags that can be set in the urgency field are, Forbidden: the AOP should not distributed to the client or client group Fair_Play: use fair play mode (see below)

Very_urgent: overrides client priorities

Urgent: client will be alerted

Normal: delivered according to client priorities

Not_Urgent: delivered by best effort

A simple format could be:

<number of entries><client 1><urgency for client 1><client 2><urgency for client 2>

Later items in the list overrides previous items. The Field:

2. all Forbidden, client_3 Urgent could e.g. mean that all clients are forbidden to receive the AOP with the exception of client number 3 that will get the AOP in the Urgent mode.
9) Size of payload.
10) Application specific payload that describes the object or the modification of the object at the time that is given in the time stamp.

The application control protocol (ACP) is used for sending control messages between game clients, application access server units and the application lobby server (ALS). An outline of ACP is provided here. Each ACP packet consists of a header and a message body.

An ACP message has the following fields.
1) ACP message type
2) Time stamp showing the time in the game when the message was generated
3) Size of message
4) Message body Note that the source of the message is identified by higher protocol levels. In the following the messages that can be transmitted using ACP will be outlined.

ACP messages from client to the application access server include the following:

Terminate client The application access server management system removes the client from all records and notifies the Application Lobby Server. The client is responsible for notifying the ALS if it is leaving the game. The ALS is responsible for finalizing the contact with the terminated client e.g. by sending the final scores and notifying other players.

Priority list. The priority list is described above.

Add game object. A new game object number is generated by the application access server and a application access server memory is allocated for receiving object state information from the client.

Remove game object. The object is removed from all application access server memory after that all clients and remote application access server units that are listed for receiving updates have the last update.

Send estimated latencies for objects. This request includes a list of object numbers. The application access server responds by sending the estimated end-to-end latencies for the objects. The client application uses the estimates for latency hiding.

Define object group. Object groups are useful for setting short names on long lists of object numbers that otherwise might have to be sent other the client link. DirectPlay handles hierarchical "player" groups so the game API will be able to provide useful group definitions. The application access server stores object group information and treats an object group as an alias for a list of objects. The message might have the format message type=define object group;><object group name><list of objects>

Define client group. Client groups are useful for setting short names on long lists of client numbers that otherwise might have to be sent over the client link in AOP fields. The application access server stores client group information and treats a client group as an alias for a list of clients. The message might have the format, message type=define client group <client group name><list of clients>

Send time reference. This message is used for downloading a reference time from the application access server.

ACP messages from the application access server to the client include the following:

Urgency list. This message is used for alerting the client if urgent unread AOPs are waiting. The application access server scans all unread AOPs that has the present client on the AOP recipient list. The urgency list could have the format:

<urgency class 1><list of object numbers><urgency class 2><list of object numbers>

Latency estimate. This consists of a set of entries according to:

<game object number><upstream latency><upstream latency variance>

<downstream latency><downstream latency variance>

A "don't know" symbol can be used for any but the first field.

Confirm object group number. The application access server has received a "define object group" message from a client. It confirms that a global object group number has been allocated. The message body would include.

<global object group number><clients object group name>

A simple method for allocating object numbers would be: Assume that a total of N application access server units are active. Enumerate all active application access server units. If application access server number k is asked for a new object number it allocates the lowest free object number from the series {k, N+k, 2N+k, 3N+k, ... }

Confirm client group number. The application access server has received a "define client group message" from a client It confirms that a global client group number has been allocated. The message body would include <global client group number><clients client group name>

The same algorithm that is used for allocating global object group names could be used for allocating client group names.

Clock synchronization. The application access server sends a time reference according to:

<client time>=<time>+<client link latency>

The client has an algorithm for adjusting the local clock according to a series of received clock synchronization messages.

ACP messages from one application access server to another include:

Aggregated priority list. Aggregated priority lists showing what objects that the clients belonging to the sending application access server need to see, that is, the objects for which information should be sent to the sending application access server. The list has the same format as a simple client priority list. It is built by adding all valid local client priority lists and removing duplicates Resend request. This message has the same format as a simple priority list and is interpreted as a request for resending the state of the listed objects.

Define object group. Object group definitions may be distributed between application access server. Using global names for long lists of object numbers helps in reducing traffic.

Define client group. Client group definitions may be distributed between application access server.

ACP messages from an application access server to an application lobby server include:

Client has been terminated. This message is sent when a client has voluntarily disconnected from the game.

Client rime-out The application access server may send a message to the ALS if a client has been silent for a long time or if the link to the client is closed. The ALS decides on further actions such as removing the client from the game.

An ALS can act as a client. The ALS might e.g. control game objects that keep the scores of the game. A port of the ALS is then connected to the AAS as a client using TCP/IP as "link" protocol. The ALS can therefore use the same messages as a client. Other ALS to AAS messages are listed here:

Application set-up information, including

Network address including port number that identifies the ALS

An URL that uniquely identifies the game

IP addresses of other application access server units that participates in the game A list of network addresses including application port numbers that identifies the clients Optionally a list of enumerated game objects. For each object it is specified which application access server that is responsible for storing the state. It might also be specified who is authorized to update the state.

Optionally, an initial game state to be stored.

Optional data specifying control strategies such as the time-ours.

Add application access server. The network address, number and client list of the new application access server is specified.

Remove application access server. The number of the application access server to be removed is specified Add client. This includes the network address of the new client; optionally the initial state of the new game objects that are controlled by the new client.

Remove client. The application access server system removes the client from the game.

Modified client status. This message changes the clients authority to control game objects or associates the client to a different application access server. The format could be:

<client number><application access server number><object numbers> where the object numbers indicates game objects that are controlled by the client.

The Application Transport Protocol (ATP) is used for transporting Application Object Packets (AOP) and Application Control Protocol (ACP) messages The ATP has a series of AOPs and ACP messages in the payload and is mainly used for sending aggregated data between application access server units. application access server units would typically communicate with the protocol stack IP/UDP/ATP. ATP is hence at the same logical level as the RTP protocol.

The ATP header includes:

An URL that identifies the game

Earliest AOP or ACP time stamp

Latest AOP or ACP time stamp

Number of AOPs and ACP messages

Note that ATP typically only is used for application access server-to-application access server communication as shown, If the bandwidth of the connection between a client and an application server is sufficiently high it may also be used for these connections.

Conventional protocols such as TCP/IP and/or UDP/IP are used for communication with the Application Lobby Server and other application access server units. TCP/IP should be used for setting up the game and UDP/IP should be used for sending real-time game data.

TCP resending and reordering is too slow and complex for the game application. TCP reordering might delay the delivery of the most recent update for the purpose of delivering too old data Resending of data that no longer is needed is obviously wasteful. The application access server units know the precise priorities and can request resending from several sources if needed.

RTP can be used for sending time stamps but RTP is designed for audio and video streams and is not precisely, what is needed for game streams. RTP assigns a time stamp to each RTP packet while a game time stamp must be associated to each Application Object Packet (AOP) as described in section 6.4. The concept of mixing in RIP is not applicable to game data. RIP could, however, be used for carrying voice and video streams that are associated with games.

A "fair play mode" may also be implemented in the system. In this mode the application access server units synchronize the delivery of critical application information so those updates are received all clients concerned simultaneously. This mode can be used for competitions.

The Application Lobby Server decides, while setting up an application, if the fair play mode is available. If the fair play mode is allowed, the sending client decides for each transmitted AOP if fair play delivery should be used. This is done by setting the Fair_Play flag in the urgency field of the AOP. The application access server system is now responsible for delivering the AOP "simultaneously" to all clients. This requirement overrides all other client priorities.

A possible technical solution for this is the "bucket synchronization" method. The application access server units agree to update the clients with a fixed absolute delay. Updates arriving earlier have to wait for the agreed time slot. This method has the disadvantage of increasing the overall delay in the system. The fair play mode can alternatively be handled by the game application.

Some clients may be registered with an application access server as spectators. Spectators are not allowed to upload game actions but they can upload a priority list that depends on the spectator's point of view in the game.

Figure 6:
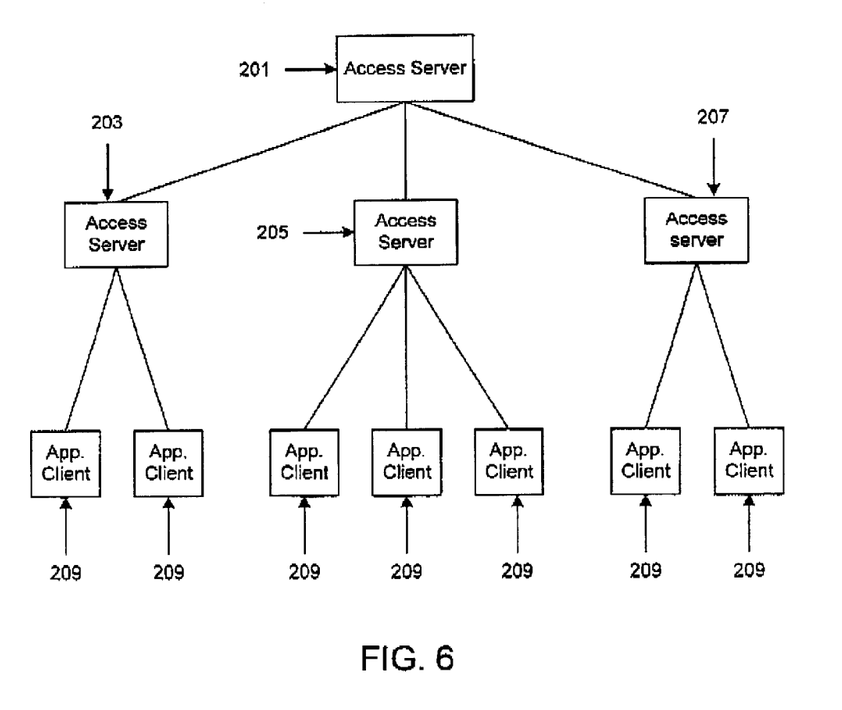
FIG. 6 is a schematic representation of a hierarchical structure of application access servers used in an embodiment of the invention.

Application access servers according to the invention may also be used in hierarchical systems. FIG. 6 shows an example of such a configuration in which an higher-level application access server 201 serves other application access server units 203. 205, 207, which in turn serve application clients 209. The higher-level application access server 201 receives ATP packets with game data and aggregated priorities from downstream application access server units that are considered to be "clients". The higher-level application access server unit 201 communicates with other peer application access server units and possibly with application access server units that are on a still higher level in the hierarchy. Hierarchical application access server systems are used for creating a hierarchical distributed representation of the game state for an application involving a large number of clients.

Remote application access server units might be organized in a multicasting tree and in that case there will be one sorting buffer per multicasting group. A simple distribution strategy where all information is sent to all remote application access server units may be used. In that case there is only one buffer.

A set of application clients could have broad band and low latency access so that no application access server is needed. A typical example is that all players are on the same LAN. If the game application and API still expects an application access server, it would be possible to run an application access server function in software on the client machine.

A application access server unit could also be situated at any intermediate position in the network. This means that the "link" protocol between client and application access server optionally could be UDP/IP or TCP/IP.

Alternatively, a central game server running a dial-in game service could use application access server units as components. The central site would then consist of a set of modem pools that are connected to application access server units and Application Lobby Servers. This would be an efficient and saleable architecture for building a central site but it would not have the advantage of early aggregation of game traffic.

What is claimed is:

1. An application-independent access server for providing enhanced real-time collaborative communication between multiple clients in a network, utilizing a common application that is resident on each of said multiple clients, comprising, for each one of said multiple clients:

an input buffer for receiving client application object packets for updating application objects that are controlled by each one of said multiple clients;

an application object packet pipeline for directing application state data derived from said application object packets to each client priority list associated with each one of said multiple clients;

an application state record for receiving and maintaining all said application state data and urgency-of-application data for relevant objects for each one of said multiple clients;

an application priority control message pipeline for directing priorities derived from said application object packets to said client priority list stored by said application-independent access server, said priorities being set and also sent to said access server by each one of said multiple clients;

a control unit for processing control data, wherein said control data is non-real-time data including information on added or removed application objects; and an output pipeline for transmitting information retrieved from an application state record of one of said multiple clients to another of said multiple clients.

2. The application-independent access server of claim 1, wherein said client application object packets include data about the state of the application residing on the respective client and data concerning client priorities.

3. The application-independent access server of claim 1, wherein the output pipeline further comprises, means for utilizing said stored priorities for determining relevant information that will be transmitted to clients other than the client associated with the relevant information.

4. The application-independent access server of claim 1, wherein each said client priority list comprises a list of all said objects for which a priority has been set by the associated one of said multiple clients.

5. The application-independent access server of claim 1, wherein said application access server further comprises a means for periodically updating said objects in said client priority list for each one of said multiple clients.

6. The application-independent access server of claim 1, wherein said output pipeline for transmitting information, further comprises a means for utilizing priority information, retrieved from said client priority list, for searching an application state record of said one of said multiple clients to select state information to transmit to one or more of other said multiple clients connected to said network.

7. The application-independent access server of claim 1, further comprising:

an input buffer for receiving object state data associated with said multiple clients wherein one or more of said multiple clients can be associated with other application access servers connected through said network to said application-independent access server; and an output buffer for sending object state data associated with each one of said multiple clients to said other application access servers.

8. The application-independent access server of claim 1, further comprises connection to an Application Lobby Server wherein the normal functions of said Application Lobby Server further includes finalizing contact with a terminated client.

9. In an application-independent access server a method for providing enhanced real-time collaborative communication between multiple clients in a network utilizing a common application that is resident on each of said multiple clients, comprising the steps of:

receiving client application object packets from said multiple clients;

utilizing said object packets for updating application objects that are controlled by each one of said multiple clients and stored by said application-independent access server;

receiving and maintaining application state data and urgency-of-application data for said stored application objects that are related to each one of said multiple clients;

said application-independent access server storing priorities of each one of said multiple clients to an associated client priority list wherein said priorities are set and also sent to said access server by each one of said multiple clients;

processing control data, wherein said control data is non-real-time data including information on added or removed application objects; and transmitting information retrieved from an application state record of one of said multiple clients to another of said multiple clients.

10. The method of claim 9, wherein said client application object packets include data about the state of the application residing on a respective client and data concerning said respective client priorities.

11. The method of claim 9, wherein the transmitting information step further comprises, utilizing said stored priorities for determining relevant information that will be transmitted to clients other than the client associated with the relevant information.

12. The method of claim 9, wherein each said client priority list comprises a list of all objects for which a priority has been set by each associated one of said multiple clients.

13. The method of claim 9, further comprising the step of updating said client priority list utilizing new information received from each one of said multiple clients.

14. The method of claim 9, further comprising the step of periodically sending object updates to each one of said multiple clients.

15. The method of claim 9, wherein the step of transmitting information retrieved from said application state record further comprises:

utilizing priority information retrieved from said client priority list for searching an application state record of said one of said multiple clients to select state information for transmitting said state information to other said multiple clients.

16. The method of claim 9, further comprising receiving object state data associated with one or more clients that are associated with other application access servers connected through said network to said application independent access server; and sending object state data associated with said one of said multiple clients to said other application access servers.

17. The method of claim 9, further comprising utilizing a data processor for processing said control data.

* * * * *